(No Model.) 6 Sheets—Sheet 3.
W. B. TURNER.
APPARATUS FOR CLEANING WASTE.
No. 599,070. Patented Feb. 15, 1898.

Witnesses:
Inventor:
Wm. B. Turner
By Pine & Fisher
Attorneys.

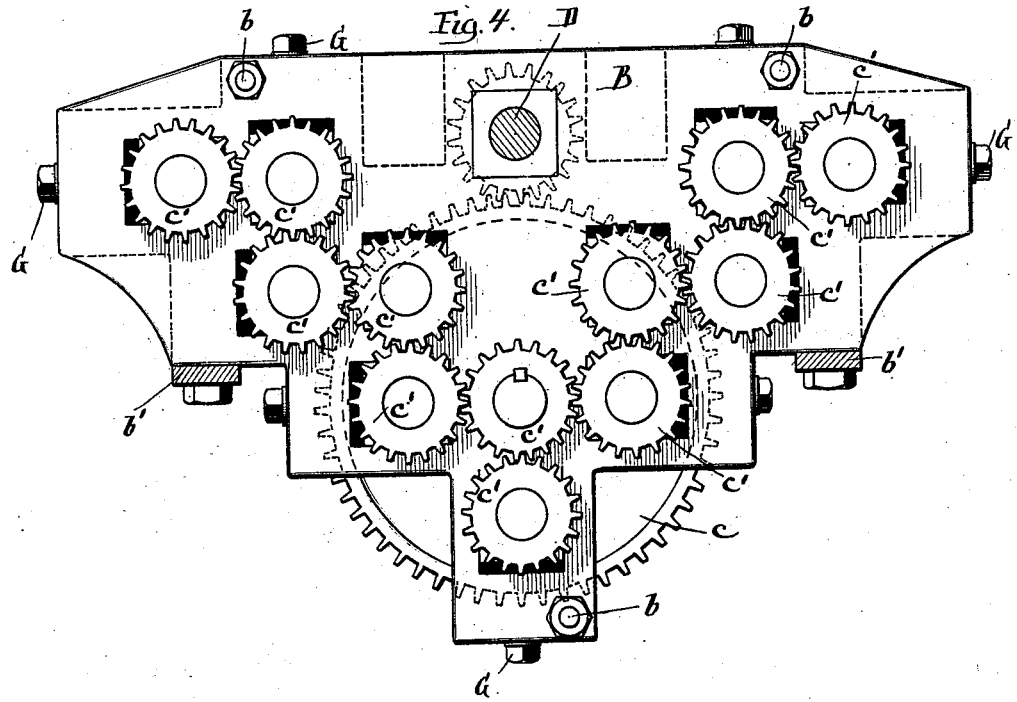
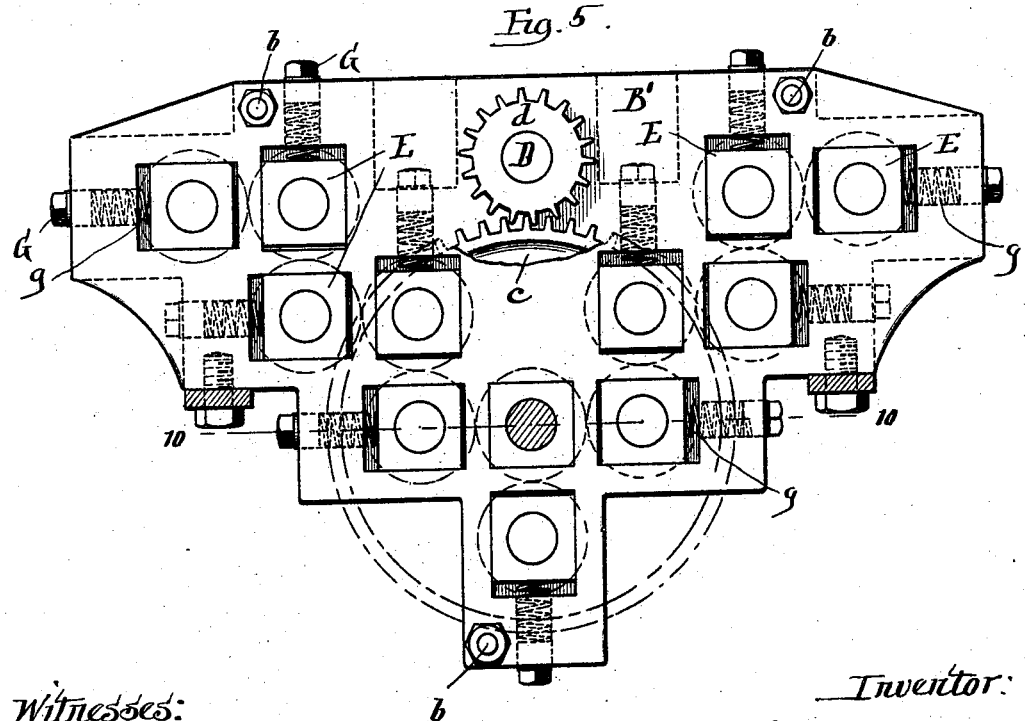

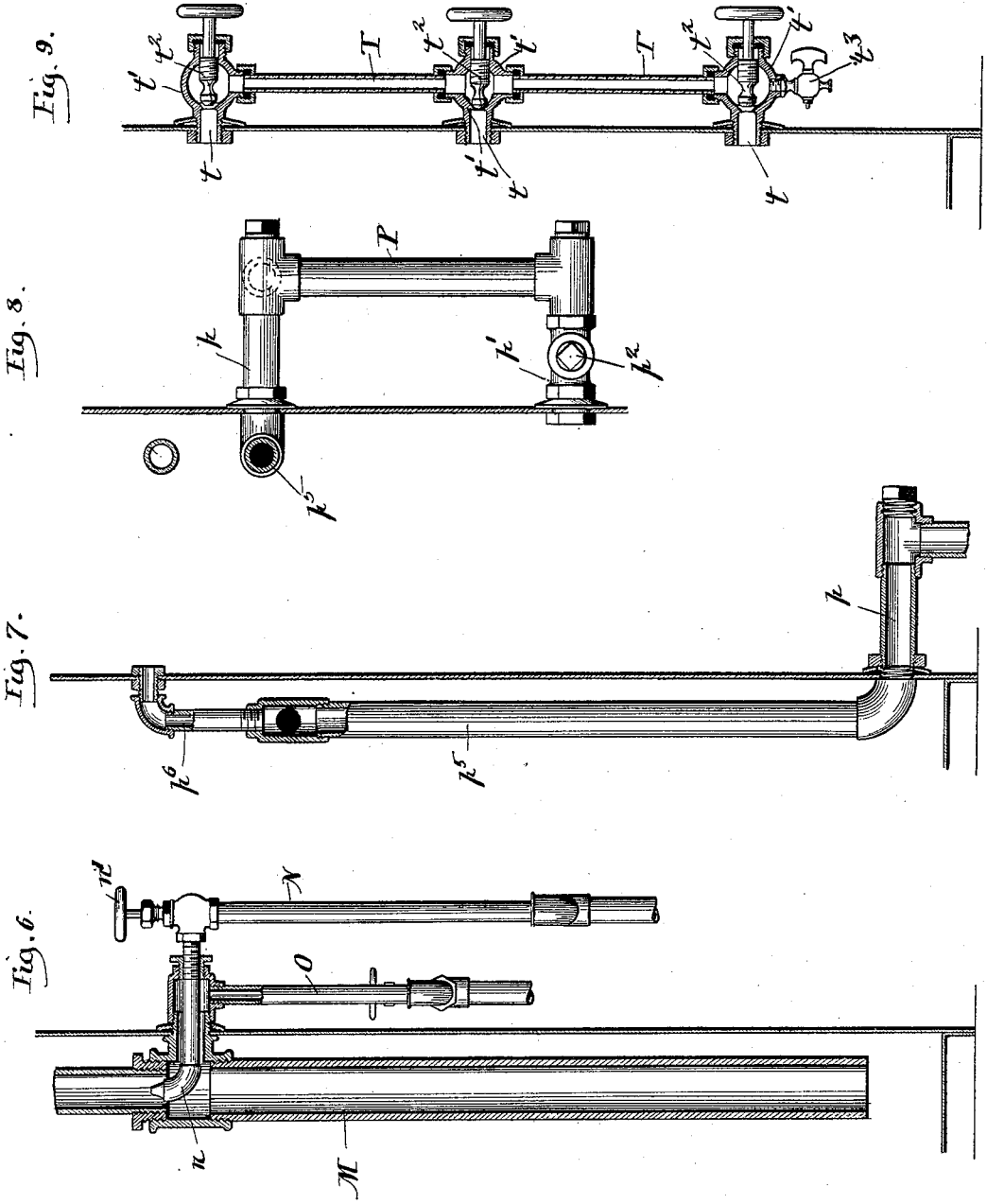

(No Model.) 6 Sheets—Sheet 6.
W. B. TURNER.
APPARATUS FOR CLEANING WASTE.
No. 599,070. Patented Feb. 15, 1898.
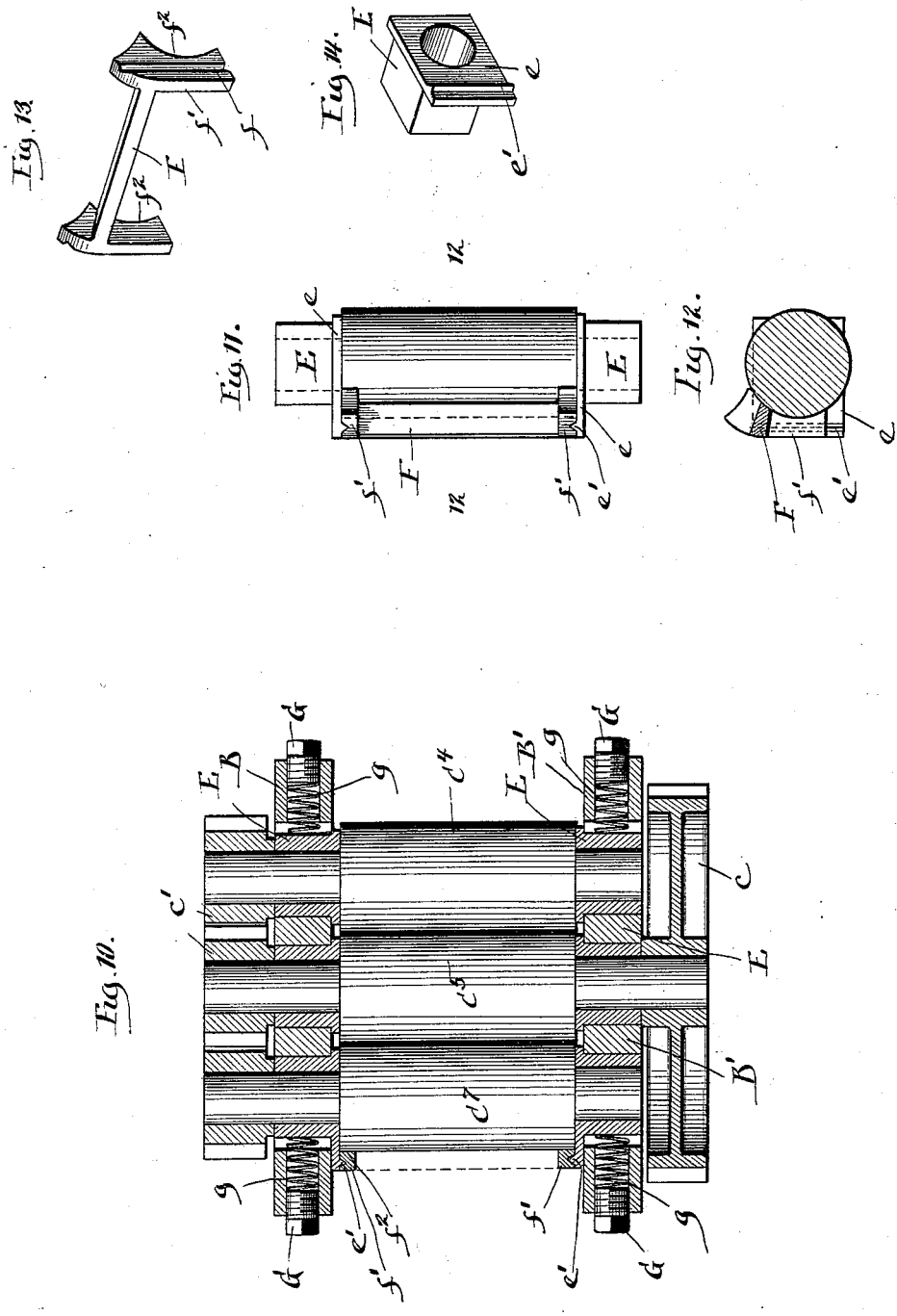
Witnesses:
Fred Gerlach
Alberta Adamick
Inventor:
Wm. B. Turner
By Pinn & Fisher
Attorneys.

UNITED STATES PATENT OFFICE.

WILLIAM B. TURNER, OF CHICAGO, ILLINOIS, ASSIGNOR TO SAMUEL INSULL, OF SAME PLACE.

APPARATUS FOR CLEANING WASTE.

SPECIFICATION forming part of Letters Patent No. 599,070, dated February 15, 1898.

Application filed January 21, 1897. Serial No. 620,077. (No model.)

*To all whom it may concern:*

Be it known that I, WILLIAM B. TURNER, a citizen of the United States, and a resident of the city of Chicago, Cook county, Illinois, have invented certain new and useful Improvements in Machines for Cleaning Cotton and Like Waste and Recovering the Oil, &c., of which I do declare the following to be a full, clear, and exact description, reference being had to the accompanying drawings, forming a part of this specification.

The present invention has for its object to provide improved apparatus designed primarily to clean cotton and like waste that is used about engines and to recover the oil therefrom, so that both the waste and the oil can be again used.

The invention will also be found applicable in whole or in part to other purposes.

The invention consists in the various novel features and combination of parts hereinafter described, illustrated in the accompanying drawings, and particularly pointed out in the claims at the end of this specification.

Figure 1:
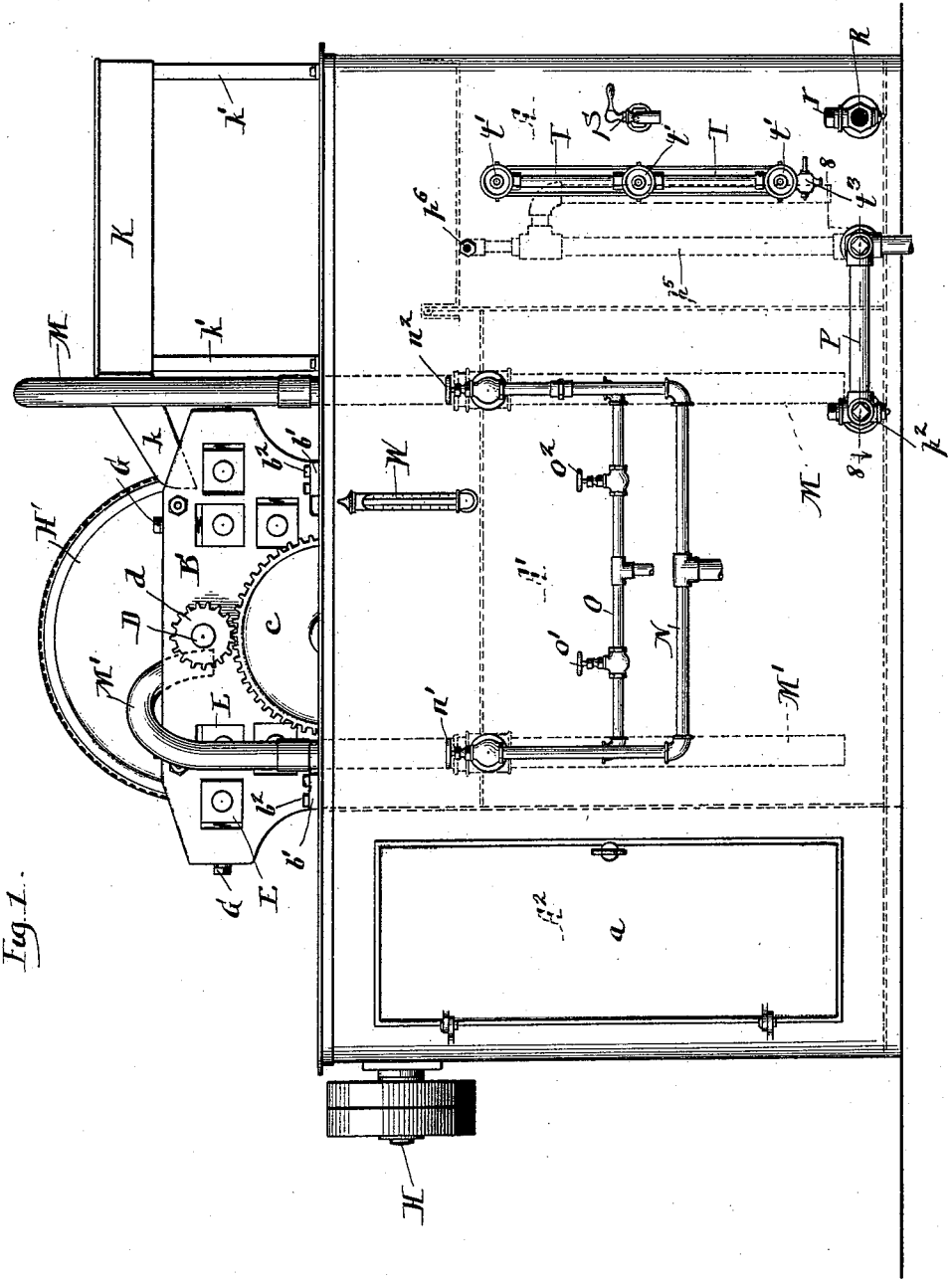
Figure 2:
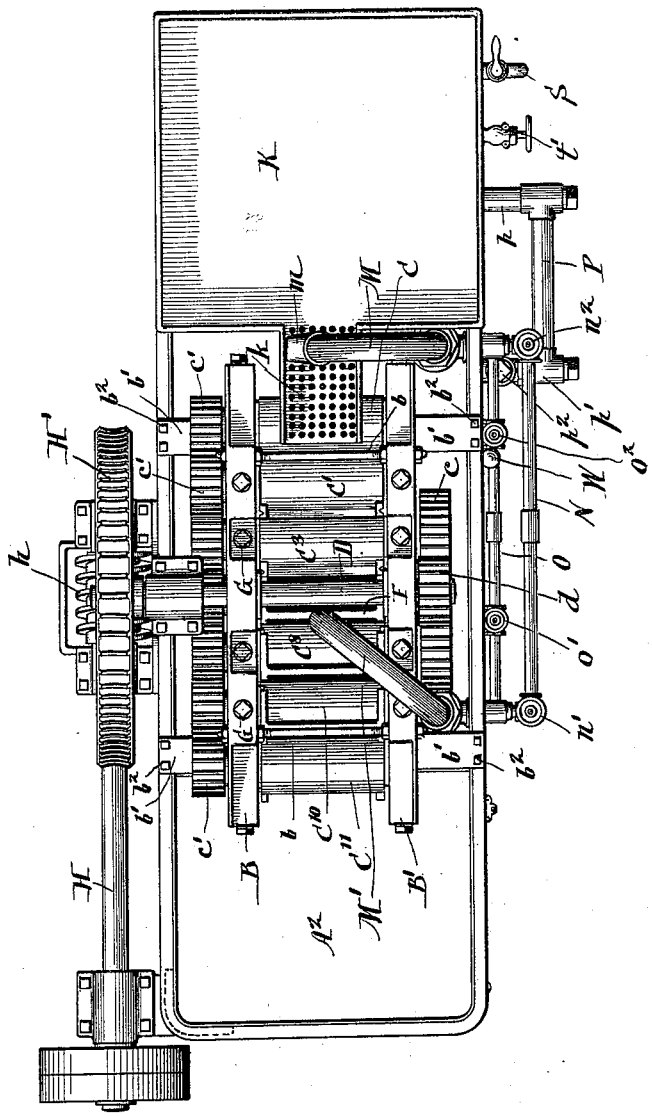
Figure 3:
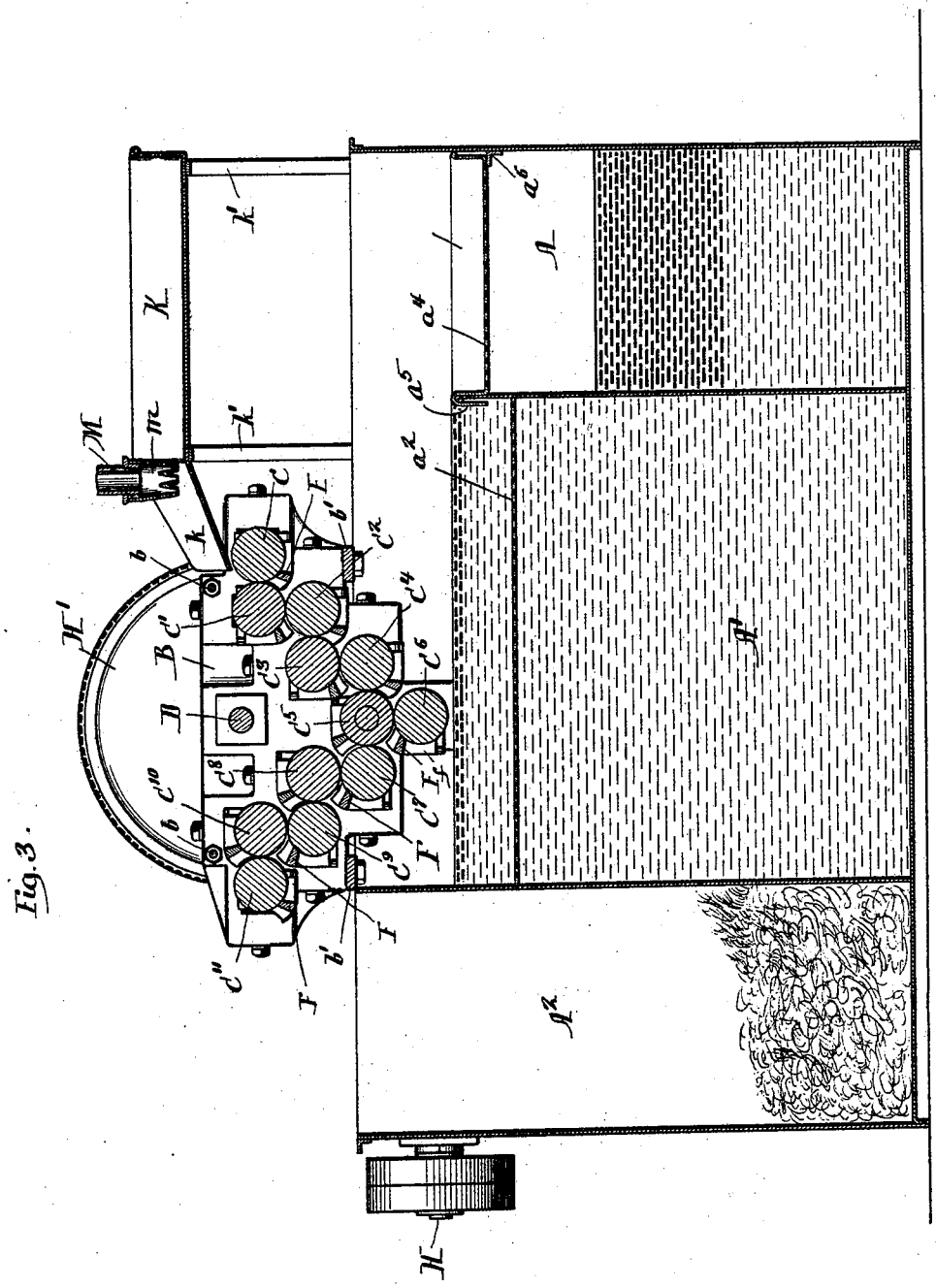

Figure 1 is a view in side elevation of my improved apparatus. Fig. 2 is a plan view. Fig. 3 is a view in central vertical longitudinal section. Fig. 4 is a view in side elevation of the roller mechanism and the frame sustaining the same. Fig. 5 is a view similar to Fig. 4, but taken from the opposite side of the roll-sustaining frame, the greater portion of the main gear-wheel being broken away. Fig. 6 is a detail view, in vertical section, through the side wall of the inclosing casing and through the circulating-pipe adjacent thereto, the injector-pipe, a part of the water-supply pipe, and the steam-pipe being shown in elevation. Fig. 7 is a detail view, partly in vertical section and partly in elevation, of the water-overflow pipe located in the oil-receiving chamber. Fig. 8 is a detail view, in horizontal section, on line 8 8 of Fig. 1. Fig. 9 is a detail view, in central vertical section, through the side of the oil-receiving chamber and through the gage-fittings connected thereto. Fig. 10 is a view in horizontal section on line 10 10 of Fig. 5. Fig. 11 is a detail plan view of one of the rolls and its box and the scraper in position with respect thereto. Fig. 12 is a view in section on line 12 12 of Fig. 11. Fig. 13 is a detail perspective view of one of the scrapers. Fig. 14 is a detail perspective of one of the roll journal-boxes.

The main casing of my improved apparatus is divided, as clearly seen in Figs. 1 and 3, into three compartments, of which A designates the oil-collecting chamber, A' the main water-chamber, and $A^2$ the clean-waste chamber, this chamber $A^2$ being preferably formed with a door $a$ at its side for the convenient removal of the clean waste. Upon the top of the main casing is sustained the roll-carrying frame, that is shown as consisting of the two side plates B and B', united at suitable points by the tie-rods $b$ and by the cross-bars $b'$, the ends of these cross-bars $b'$ being conveniently bolted, as at $b^2$, to the angle-iron that runs around the top of the casing, as clearly shown in Fig. 2. Each of the side frames B and B' is formed with a number of corresponding openings to receive the journal-boxes that sustain the several rolls C C', $C^2$ $C^3$, $C^4$ $C^5$, $C^6$ $C^7$, $C^8$ $C^9$, $C^{10}$ $C^{11}$, and that sustain the counter-shaft D.

The preferred construction of journal-box employed for all the rolls, except the roll $c^5$, is that illustrated more particularly in Figs. 11 and 14 of the drawings. This journal-box consists of a body E, wherein the journal of the rolls will rest, this body being somewhat smaller in one direction than the corresponding opening of the side frame and being provided at its inner end with a flange $e$, that abuts against the inner face of the side frame, (see Fig. 10,) and being provided, preferably, also with a guide-rib $e'$, adapted to enter a corresponding groove $f$, that is formed in the end bars $f'$ of the scrapers F. (See Figs. 11 and 13.) The end bars $f'$ are formed at one side with curved edges $f^2$, that bear against the rolls and thus retain the scrapers F in accurate position with respect thereto.

In order to maintain a firm but yielding pressure between the various sets of rolls C C', &c., I provide bearing-springs $g$, that press against the journal-boxes E of the rolls, these bearing-springs being held within suitable seats or sockets of the side frames and being retained in place and adjusted by means of screws G, that enter threaded holes at the ends of the spring-seats. Motion is transmitted to the train of rolls C C', &c., from the main drive-shaft H, preferably by a worm $h$ and worm-wheel H', this worm-wheel H' being fixed to the outer end of the counter-shaft D. The opposite end of this counter-shaft D carries a pinion $d$, that meshes with the gear-wheel $c$, that is keyed to the end of the shaft of the roll $C^5$. The train of rolls C C', &c., have their shafts extended beyond the side frame B (see Figs. 2 and 4) and provided with pinions $c'$, by which the various rolls of the train are geared together.

The roll-carrying frame and rolls are set above the water-chamber A' of the main casing, and above the rolls C C' extends a delivery-chute $k$, that leads from a waste tray or receptacle K, that is conveniently sustained by standards $k'$; rising from the top of the casing. The bottom of the chute $k$ is perforated, as clearly seen in Figs. 2 and 3, and above this chute is mounted an extended delivery-nozzle $m$, that is connected to the upper reverted end of the water-circulating pipe M. The nozzle $m$ extends practically across the entire width of the chute $k$, and upon its under side is furnished with rows of holes or perforations in any convenient number or arrangement in order to deliver the water in proper manner onto the waste as it is fed forward down the chute $k$ and into the train of rolls C C', &c. The lower end of the circulating-pipe M terminates a short distance above the bottom of the water tank or compartment A', (see dotted line, Fig. 1, and see Fig. 6,) and in order to effect the circulation of the water through the pipe M, I lead into this pipe an injector-pipe $n$, that leads from the steam-supply pipe N. Preferably also a fresh-water supply-pipe O is united by suitable couplings with the circulating-pipe M, and the steam-supply pipe and water-supply pipe N and O will be provided with suitable cocks $n'$ $n^2$ and $o'$ $o^2$, as clearly shown in Figs. 1, 2, and 6 of the drawings. Centrally above the train of rolls extends the reverted end of a circulating-pipe M', similar in construction to the pipe M last described and having its lower end extending to a point adjacent the bottom of the water chamber or compartment A', and the circulation of water through this pipe M' is effected by a steam-injector $n'$, that is connected with one of the branches of the steam-supply pipe N, and preferably one of the branches of the water-supply pipe O is united to the circulating-pipe M', as in the construction illustrated in Fig. 6. It will be understood by reference to Figs. 1 and 6 that the circulating-pipes M and M' and their connections are the same.

From the construction of parts as thus far defined the operation will be seen to be as follows, viz: The mass of dirty cotton or like waste to be cleaned will be placed within the tray K and will be fed forward down the chute $k$ and beneath the nozzle $m$ into the bite of the rolls C and C'. As the waste thus passes beneath the nozzle $m$ the supply of hot water delivered upon the waste will cause heavy particles—such as dirt, metal, or the like—that are carried thereby to pass downward through the perforations in the bottom of the chute $k$, whence they will fall into the upper part of the water chamber or tank A', and at the same time portions of the oil will be freed from the waste by the action of the water and will also fall into the top of the tank or chamber A' and float upon the surface of the water. The waste will then pass from the chute $k$ between the rolls C and C' and will be squeezed thereby in order to express the water and oil, and from these rolls the waste will pass downward between the bite of the rolls C' and $C^2$, being guided by the scraper F, located beneath the roll C. The scraper F, fitting, as it does, closely against the surface of the roll C, will serve to clean the surface of the roll and prevent the adherence of the waste thereto. The supply of water delivered by the circulating-pipe M' will stand about the level of the lower part of the rolls C C' and $C^{10}$ $C^{11}$. Consequently as the waste passes from one set of rolls it will be submerged in the hot water before passing between and being squeezed by the next succeeding set of rolls. Thus after leaving the rolls C' $C^2$ the waste will pass between the rolls $C^2$ $C^3$, thence between the rolls $C^3$ $C^4$, thence between the rolls $C^4$ $C^5$, thence between the rolls $C^5$ $C^6$, thence upward between the rolls $C^6$ $C^7$, thence between the rolls $C^7$ $C^8$, thence between the rolls $C^8$ $C^9$, thence between the rolls $C^9$ $C^{10}$, and, finally, between the rolls $C^{10}$ and $C^{11}$. The final pair of rolls $C^{10}$ and $C^{11}$ act as drying or wringing rolls, and these rolls serve to express the water from the cleaned waste, and from these rolls the waste will pass into the receptacle $A^2$. During its passage through the train of rolls C C', &c., and through the body of water, which is maintained upon a level with the lower portion of the rolls C C', the waste, being successively subjected to the action of hot water and being successively squeezed by the rolls, will be thoroughly cleaned before it is finally delivered from the end of the train of rolls and into the clean-waste receptacle $A^2$.

It will be observed that each of the rolls C C', &c., is provided with a corresponding scraper, as hereinbefore described. The supply of hot water delivered through the nozzle $m$ of the circulating-pipe M and through the upper end of the circulating-pipe M' will pass down between the rolls into the tank A', carrying with it the oil that will float upon the top of the water within the tank. Preferably the upper portion of the tank A' is provided with a screen $a^2$ to catch any large particles of waste or the like that may chance to escape from the roll. Inasmuch as the circulating-pipes M and M' take the water from the lower part of the tank A' it will be seen that the same supply of water may be used over and over again; but by means of the water-supply pipe O fresh water may be added from time to time.

It will be readily understood that as the oil accumulates upon the surface of the water within the tank A' it will float off over the edge of this tank into the oil-collecting tank A and will float upon the surface of a body of water which is preferably maintained within the lower portion of this oil-collecting tank. Preferably the upper part of the tank A is furnished with a screen $a^4$, adapted to arrest any large particles of waste or the like that may be carried over with the oil, and by preference this screen $a^4$ is provided with a reverted lip $h^5$ at one end to engage the upper edge of the wall between the tanks A and A', and the opposite end of the screen $a^4$ rests upon an angle-plate $a^6$, affixed to the wall of the casing. (See Fig. 3.) The screen $a^4$ can thus be conveniently removed from time to time as required. Into the bottom of the oil-collecting tank A and of the water-tank A' lead branches $p\,p'$ of the drainage-pipe P. The branch $p'$ is shown as provided with a cock $p^3$, that will be normally closed, but the branch $p$ is shown as connected with a "gooseneck" discharge-pipe $p^5$, the shorter arm of which, as clearly shown by dotted lines in Fig. 1, extends to a point slightly above the bottom of the tank A, and from the top of the pipe $p^5$ leads a vent-pipe $p^6$, that opens through the side of the casing and serves to prevent the siphoning of the liquid from the tank A'. (See Fig. 7.) The bottom of the oil-collecting tank A is furnished with a pipe R, normally closed by a cock $r$ and serving for removing any sediment that may collect at the bottom of the tank. The tank A is also provided, preferably about midway, with a cock or faucet S, by which the oil may be withdrawn. Through the sides of the oil-collecting tank A lead the nipples $t$ of the valve-casing $t'$, that are united to the vertical sight glasses or tubes T, as clearly shown in Fig. 9. Each of the valve-casings $t'$ is furnished with a valve $t^2$, and preferably the lowermost valve-casing is provided with a drain-cock $t^3$. In practice the valves $t^2$ of the several valve-casings will be open, and consequently the sight-glasses T will show the height of the column of oil and water within the tank A.

In using my apparatus the discharge-pipe $p^5$ will serve to regulate the height of liquid maintained within the tank A by withdrawing the water from the lower part of this tank. The operator by observing the sight-glass T can readily ascertain at all times the height of the oil and water within the tank A, and by opening the cock S can withdraw the oil from time to time as may be necessary. By the use of the circulating-pipes M and M' not only is a great saving in water effected, but the same supply of water being maintained within the tank a more thorough saving of the oil is insured than would be possible if the water were allowed to flow directly into the oil-collecting tank after being once used. As seen in Fig. 1, a thermometer W may be attached to the casing in order to maintain the water at proper temperature, which can be varied by the admission of fresh water through the supply-pipe O.

It is manifest that the precise details above described may be varied within wide limits without departing from the scope of my invention. Thus, for example, the compressing-rolls may have true cylindrical faces or may be corrugated and covered with rubber or the like, and the number and arrangement of the rolls may be varied as the skill of the mechanic may suggest.

So far as I am aware my invention presents the first instance of an apparatus of the character described in which there is provided a train of compressing-rolls arranged above the water-level of a tank and with a supply-pipe for delivering water above the compressing-rolls, so that said rolls and the material passing between them is submerged, while the impurities are caused to pass away from the rolls and the material into the subjacent tank and away from contact with the rolls. In carrying out this invention it is manifest that the details of construction above described may be varied within wide limits by the skilled mechanic.

Having thus described the invention, what I claim as new, and desire to secure by Letters Patent, is—

1. In apparatus of the character described, the combination with a water-tank, of a frame or casing extending above said tank and having side portions adapted to inclose a train of rolls contained within said frame or casing and maintain the same submerged, a train of compressing-rolls extending across and within said frame or casing at a point above the water-level of said tank and a supply-pipe for admitting water to said casing above the rolls whereby the waste passing between the rolls travels through the water and whereby the oil and other impurities may fall away from the waste and from the rolls into the subjacent tank.

2. In apparatus of the character described, the combination with a water-tank, of a frame or casing arranged above said tank, a train of compressing-rolls extending across said frame or casing and arranged in pairs at different horizontal levels above the water-line of said tank and a supply-pipe for maintaining water within said frame or casing at a point above the meeting-line of certain of said pairs of rolls, whereby the waste or material passing through the rolls may be compressed while submerged and whereby the oil and other impurities may fall away from the waste and away from the rolls into the subjacent tank.

3. In apparatus of the character described, the combination with a water-tank, of a frame or casing elevated above the water-line of said tank, a series of compressing-rolls within said frame or casing, said series of rolls being arranged in pairs located in different horizontal and vertical planes, the central pairs of rolls being located below the end rolls and means for maintaining water within said frame or casing at a point above the meeting-line of the central pairs of rolls.

4. In apparatus of the character described, the combination with a suitable frame or casing having closed ends, of a series of pairs of compressing-rolls extending across said casing at different horizontal and vertical planes, the central pairs of rolls being arranged below the level of the end pairs of rolls and means for supplying water above said rolls whereby the upper surface of the waste or like material may be subjected to the force of the water-supply as it passes through the succeeding pairs of rolls.

5. In apparatus of the character described, the combination of a water-tank and an oil-collecting tank adapted to receive the overflow from said water-tank, of a series of compressing-rolls arranged above the water-level of said water-tank and means for supplying water above said compressing-rolls, whereby the waste or like material is flooded and compressed as it passes through said rolls, and whereby the oil and like impurities are delivered into a tank away from and undisturbed by said rolls.

6. In apparatus of the character described, the combination of a train of compressing-rolls whereby the waste is compressed, the spring-seated journal-boxes for said rolls, and individual scrapers for said rolls, said scrapers being located between the pairs of rolls in order to guide the waste from one pair of rolls to the other.

7. In apparatus of the character described, the combination with a water-tank, of an elevated delivery-chute arranged above said water-tank and having a perforated bottom, a spray or nozzle arranged above said chute for delivering water onto the waste upon the chute, a train of rolls elevated above said water-tank and arranged to receive the waste from the end of the chute, said train of rolls comprising pairs of compressing-rolls arranged in different horizontal and vertical planes, whereby the impurities washed from the waste may fall into the subjacent tank, a frame or casing for sustaining said train of rolls and a supply-pipe for delivering water into said frame or casing in order to submerge said rolls, whereby the waste may be subjected to successive squeezings by the pairs of rolls and whereby the impurities of the waste may be removed therefrom.

8. In apparatus of the character described, the combination with a water-tank, of a frame or casing elevated above the water-line of said tank, a series of compressing-rolls within said frame or casing, said train of rolls arranged in pairs located in different horizontal and vertical planes and scrapers extending across the face of said rolls and arranged also to guide the waste from one set of rolls to the other, and a water-pipe for supplying water to said elevated frame or casing.

9. In apparatus of the character described, the combination of mechanism for compressing the waste, a subjacent water-tank, a circulating-pipe leading from said water-tank to a point above said compressing mechanism and a steam-jet for effecting the circulation of water within said pipe, substantially as described.

10. In apparatus of the character described, the combination of mechanism whereby the waste is compressed, a water-tank beneath said compressing mechanism, a chute for conducting the waste to said compressing mechanism, a circulating-pipe whereby the water is withdrawn from the tank and delivered to the waste as it passes through the compressing mechanism, and a second circulating-pipe whereby the water is withdrawn from the tank and delivered to the waste as it passes along the delivery-chute, and steam-injectors for causing the water to circulate through said pipes, substantially as described.

11. In apparatus of the character described, the combination of mechanism whereby the waste is compressed, a water-tank beneath said compressing mechanism, means for supplying water to a point above said compressing mechanism, an oil-tank communicating with said water-tank and adapted to receive the overflow therefrom, said oil-collecting tank being provided with a "gooseneck" discharge-pipe provided at its top with a vent to prevent the siphoning of the liquid from the tank, substantially as described.

WILLIAM B. TURNER.

Witnesses:
GEO. P. FISHER, Jr.,
ALBERTA ADAMICK.